United States Patent

[11] 3,547,236

| [72] | Inventor | Gerhard Liesegang<br>Hamburg, Germany |
|---|---|---|
| [21] | Appl. No. | 764,443 |
| [22] | Filed | Oct. 2, 1968 |
| [45] | Patented | Dec. 15, 1970 |
| [73] | Assignee | Lisega Rohrleitungszubehor G.m.b.H.<br>Hamburg, Germany |
| [32] | Priority | Oct. 5, 1967 |
| [33] | | Germany |
| [31] | | No. 1,650,086 |

[54] HYDRAULIC SHOCK MOUNT FOR PIPE-LINE SYSTEMS
2 Claims, 2 Drawing Figs.

[52] U.S. Cl. ..................................................... 188/280,
188/100
[51] Int. Cl. ..................................................... F16f 9/19,
F16f 9/34
[50] Field of Search.......................................... 188/94, 97,
97.1, 88.51, 100; 16/51, 52; 137/513.3

[56] References Cited
UNITED STATES PATENTS

| 1,156,011 | 10/1915 | Kenney | 137/513.3X |
| 1,833,121 | 11/1931 | Norton | 188/97UX |
| 2,353,161 | 7/1944 | Heigis et al. | 137/513.3X |
| 2,778,259 | 1/1957 | Moir | 188/97(.1)X |
| 3,419,114 | 12/1968 | Rumsey | 188/97 |

FOREIGN PATENTS

| 400,382 | 10/1933 | Great Britain | 188/97 |

Primary Examiner—George E. A. Halvosa
Attorney—Waters, Roditi, Schwartz & Nissen ABSTRACT: A hydraulic shock mount for pipeline systems having a damper piston and a pressure cylinder, one of which is supported by a stationary abutment, and the other attached to the pipeline whose movements are to be damped, the cylinder chambers on both sides of the piston being connected to its own independently operating throttling means, the cylinder with its damping piston and throttling means being arranged inside a common housing which serves as reservoir and pressure-equalizing chamber for the pressure fluid.

PATENTED DEC 15 1970

3,547,236

HYDRAULIC SHOCK MOUNT FOR PIPE-LINE SYSTEMS

BRIEF SUMMARY OF THE INVENTION

The invention relates to a hydraulic shock mount for the prevention of oscillations and shocks in hanger-suspended pipe lines, such as the start-up and blowoff lines in steam-operated power plants.

A known hydraulic shock mount for hanger-suspended pipeline systems, comprises a damping piston and a cylinder, one of which is supported by a stationary abutment, whereas the other is attached to the pipe line. The cylinder chambers on both sides of the piston are connected to a throttling device with a piston slide valve, which, upon being displaced due to a predetermined pressure differential between the chambers on both sides of the damper piston, will shut off a hydraulic circuit. In this arrangement, the damper cylinder is connected to the housing of the piston slide valve by external piping and the housing is incorporated into the system circuit. Moreover, the equalizing reservoir is located above the cylinder, and represents yet another element with an external connecting pipe. Regardless of the complexity of the pressure-controlled valve, arrangements of this kind always involve the risk of leaks, due to the considerable number of threaded high-pressure connections. Also, the external elements are exposed to increased oscillations, since they are spaced from the center of gravity of the installation.

It is an objective of the invention, to provide a hydraulic shock mount for use with pipeline systems, which has a simplified configuration and forms an integrated unit with all its associated elements. The invention is characterized by the arrangement of the cylinder with damper piston and throttling device inside a housing which serves as reservoir and equalizing chamber for the pressure fluid, each cylinder chamber being provided with its own, independently operating throttling device.

In this arrangement, the damper, or shock mount, constitutes a complete and integrated unit. The equalizing chamber, necessitated by the volume changes occurring due to movements of the piston rod is constituted as a jacket around the hydraulic cylinder. There are no pipes, nor pressure-line connections outside of this jacket, which forms a pressure-free housing. The hydraulic shock mount thus has a solid construction and can be handled with ease and simplicity.

Preferably, the throttling device comprises a valve housing containing a valve insert with drilled bores, the housing having a valve seat for the insert and containing a spring between the seat and insert. The housing, insert and spring form a unit, which can be attached to the hydraulic cylinder. In this arrangement, dilating stresses for a piped connection are avoided. Slow movements of the protected pipe line, or of the damper piston, do not affect the pressure-controlled valve. However, when a shock, or an oscillation occurs, which accelerates the movement of the piston rod, the pressure-controlled valve will close, so that the pipe line cannot oscillate and damage to the pipeline system is thus prevented. Most appropriately, the valve housing is provided with a threaded pipe socket and key surfaces, to permit its simple and secure mounting on the hydraulic cylinder.

It is of great advantage to provide the vent opening of the equalizing reservoir with an expanding bellows which is closed to the interior of the reservoir. This avoids any contact of the pressure fluid with the atmosphere, preventing contamination and loss of the fluid.

DETAILED DESCRIPTION

Figure 1:
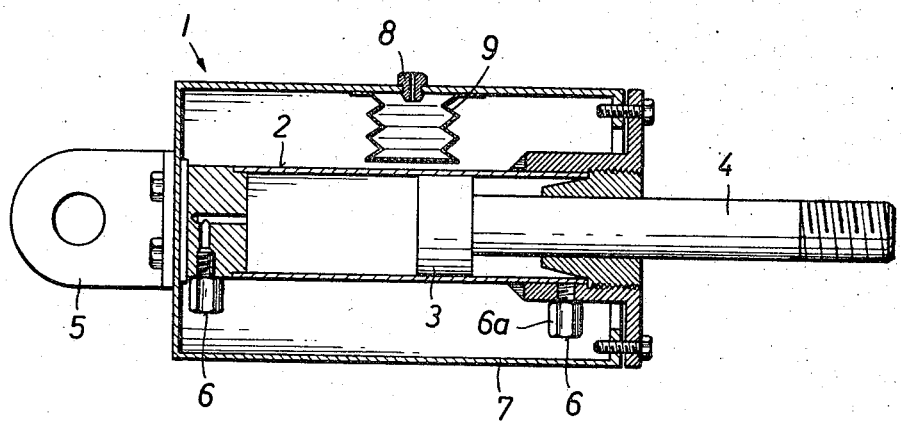
FIG. 1 is a diagrammatic representation partly in section of a hydraulic shock mount according to the invention.

In FIG. 1 of the drawing there is shown a hydraulic shock mount 1 which comprises a pressure cylinder 2 in which a reciprocating piston 3 with its piston rod 4 is slidingly supported. By means of a flange 5 the pressure cylinder can be attached to a stationary abutment, whereas the piston rod 4 can be attached to a pipe line, whose movements are to be damped. The cylinder chambers on both sides of the reciprocating piston 3 are provided with a pressure-controlled valve 6. If the shocks of the pipe line can occur in one direction only, only one pressure-controlled valve is necessary. The pressure cylinder 2 is completely incorporated in a housing 7, which serves as an equalizing chamber and reservoir for the pressure fluid. The housing 7 at the same time constitutes a protective jacket for the pressure cylinder 2. Housing 7 is provided with a screw 8 having a vent opening therein. At the vent screw 8, an expanding bellows 9, closed at its free end, is attached inside the housing 7, preventing all contact of the pressure fluid with the atmosphere.

Figure 2:
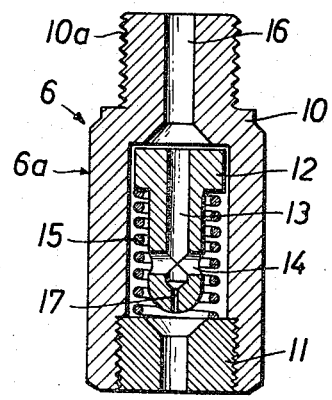
FIG. 2 is a sectional view of a pressure-controlled valve of the mount of FIG. 1 on a larger scale.

The pressure-controlled valve 6 is shown in detail in FIG. 2 and therein is seen to comprise a valve housing 10, a separate threadably engaged valve seat portion 11, an adjustable insert 12 with bores 13 and 14, and a spring 15, tending to maintain the insert 12 away from the valve seat, i.e. in open position. Another bore 16 form an inlet to the valve housing 10 from the associated chamber in the cylinder 2. A small orifice 17 is additionally provided in the valve insert 12 as a bypass for the pressure fluid, when the valve is closed.

In the event of movement of the pipe line due to normal thermal expansion, the piston 3 will move slowly inside the pressure cylinder 2. The pressure fluid will then, with the valve staying open, flow through the inlet 16 of the pressure-controlled valve 6, the bores 13 and 14 of the valve insert 12 and through the valve seat 11 into the housing 7. Any pressure surge due to rapid, accelerated movement of the piston 13, however, will increase the dynamic pressure on the valve insert to such an extent, that the insert 12 will be displaced against the action of spring 15 and lodge itself against the valve seat 11 thereby closing the valve, so that the piston cannot thereafter undergo any further movement. As soon as the pressure is relieved, the force of spring 15 will lift the valve insert 12 away from the seat 11 so that the flow of the pressure fluid through the pressure-controlled valve 6 can be resumed, to some extent. Upon return of the piston 3, the flow of the pressure fluid will be in reverse through the valve seat 11, the insert bores 14 and 13 and the inlet 16 of the pressure-controlled valve into the pressure cylinder 2. Under sustained pressure, a limited flow of pressure fluid (corresponding to normal thermal-expansion movements of the pipe line) can always escape through the fine bypass orifice 17 in the valve insert 12, so that even with valve 6 closed, slow movements of the damper piston, due to thermal expansion of the pipe line, are always permitted.

I claim:

1. A hydraulic shock mount for pipeline systems, comprising a damper piston and a pressure cylinder, one of which is supported by a stationary abutment, and the other is attached to a pipe line whose movements are to be damped, said piston defining chambers in said cylinder on both sides of the piston, throttling means connected to at least one chamber, a housing enclosing said cylinder and said throttling means and constituting a reservoir and pressure-equalizing chamber for pressure fluid in said cylinder and housing, said housing having a vent opening, and expanding bellows connected to the housing in the interior thereof to encircle the vent opening, said bellows being closed to the interior of the housing, said throttling means comprising a self-contained unit detachably secured in said cylinder and extending transversely thereof into said at least one chamber, said throttling means comprising a valve housing having an inlet in communication with the associated chamber of the cylinder and a valve seat with an outlet in communication with the interior of the housing, said inlet and outlet being aligned in transverse orientation with respect to said cylinder, a valve insert in said housing and movable transversely of said cylinder between a first position in which the valve insert is applied against said seat and a second position in which the insert is spaced from the seat, and a spring inside the valve housing acting on the insert to urge the same to said second position, said insert having a bore therein extending transversely of said cylinder to provide passage therethrough of pressure fluid between the associated chamber and the interior of the housing when the valve insert is in said second position, and a fine bypass bore in communication with the first said bore and with said outlet when the insert is in said first position, said inlet and spring being parallel and extending transversely of said cylinder, said inlet having an orifice facing said insert to apply pressure fluid thereagainst upon rapid movement of the piston thereby to urge the insert to said first position against the action of said spring, said bore in the insert being constituted by a first axial portion extending coaxially with said inlet and facing the same and a second transverse portion which opens laterally of the valve insert into the interior of the valve housing, said valve housing having a threaded surface which is threadably engaged in said cylinder for attachment and removal of said unit with said cylinder, said valve housing including a portion with a polygonal external surface, and a separate portion threadably engaged in the housing and containing said outlet and valve seat.

2. A shock mount as claimed in claim 1, wherein a separate throttling means is provided for each chamber.